(12) United States Patent
Hardinghaus et al.

(10) Patent No.: US 7,846,409 B2
(45) Date of Patent: Dec. 7, 2010

(54) DEAGGLOMERATED BARIUM SULFATE

(75) Inventors: Ferdinand Hardinghaus, Bad Honnef (DE); Christopher David Glende, Goettingen (DE); Karl Hoehler, Diekholzen (DE); Won Jai Park, Goettingen (DE); Rainer Stahl, Arnsberg (DE); Andreas Poppe, Sendehorst (DE)

(73) Assignee: Solvay Infra Bad Hoenningen GmbH, Hannover (DE)

( * ) Notice: Subject to any disclaimer, the term of this patent is extended or adjusted under 35 U.S.C. 154(b) by 551 days.

(21) Appl. No.: 10/581,685

(22) PCT Filed: Dec. 1, 2004

(86) PCT No.: PCT/EP2004/013612

§ 371 (c)(1),
(2), (4) Date: Dec. 14, 2006

(87) PCT Pub. No.: WO2005/054133

PCT Pub. Date: Jun. 16, 2005

(65) Prior Publication Data

US 2007/0140938 A1     Jun. 21, 2007

(30) Foreign Application Priority Data

Dec. 6, 2003   (DE)   ................. 103 57 116

(51) Int. Cl.
*C01B 25/32*     (2006.01)
(52) U.S. Cl. ...................... 423/267; 423/544
(58) Field of Classification Search ............... 423/266, 423/267, 544, 554
See application file for complete search history.

(56) References Cited

U.S. PATENT DOCUMENTS

| | | | | |
|---|---|---|---|---|
| 4,032,479 A * | 6/1977 | Bunnomori et al. | ......... | 525/404 |
| 4,196,107 A * | 4/1980 | Jones et al. | ......... | 524/501 |
| 4,590,996 A * | 5/1986 | Hoskin et al. | ............ | 166/244.1 |
| 4,708,805 A * | 11/1987 | D'Muhala | .................. | 210/698 |
| 4,894,093 A * | 1/1990 | Aderhold et al. | ........... | 106/461 |
| 5,312,604 A | 5/1994 | Jaeger et al. | | |
| 2003/0064228 A1 | 4/2003 | Oosedo et al. | | |
| 2003/0124048 A1* | 7/2003 | Hardinghaus et al. | ....... | 423/554 |
| 2004/0167251 A1* | 8/2004 | Amirzadeh-Asl et al. | ... | 523/200 |
| 2004/0235997 A1* | 11/2004 | Meisenburg et al. | ........ | 524/431 |
| 2005/0048877 A1 | 3/2005 | Koehler et al. | | |
| 2007/0232725 A1* | 10/2007 | Stahl et al. | .................. | 523/205 |

FOREIGN PATENT DOCUMENTS

| | | |
|---|---|---|
| DE | 195 40 623 | 5/1997 |
| DE | 197 19 948 | 11/1998 |
| DE | 197 26 829 | 1/1999 |
| DE | 199 10 876 | 10/2000 |
| DE | 199 40 857 | 3/2001 |
| EP | 0 293 622 | 12/1988 |
| EP | 0 943 664 | 9/1999 |
| EP | 1 094 087 | 4/2001 |
| EP | 1 179 575 | 2/2002 |
| WO | 99 52964 | 10/1999 |
| WO | 99 54412 | 10/1999 |
| WO | 00 14165 | 3/2000 |
| WO | 00 22052 | 4/2000 |
| WO | 00 35599 | 6/2000 |
| WO | 00 57932 | 10/2000 |
| WO | 01 58809 | 8/2001 |
| WO | 01 92157 | 12/2001 |
| WO | 02 30994 | 4/2002 |
| WO | 03 016411 | 2/2003 |

OTHER PUBLICATIONS

U.S. Appl. No. 11/916,340, filed Dec. 3, 2007, Hardingghaus, et al.
U.S. Appl. No. 11/916,408, filed Dec. 3, 2007, Hardingghaus, et al.
U.S. Appl. No. 11/916,394, filed Dec. 3, 2007, Koehler, et al.
U.S. Appl. No. 11/916,353, filed Dec. 3, 2007, Koehler, et al.
U.S. Appl. No. 11/573,613, filed Feb. 12, 2007, Koehler, et al.
Sienel et al., "Epoxides", Ullmann's Encyclopedia of Industrial Chemistry, 5 ed., vol. A9, pp. 531-563.
Kirk-Othmer, "Epoxy Resins", Encyclopedia of Chemical Technology, 4 ed., vol. 9, pp. 730-755, 1994.
Kirk-Othmer, "Composite Materials", Encyclopedia of Chemical Technology, 4 ed., vol. 7, pp. 1-40, 1993.
Bittmann, "Viel Wind Um GFK", Kunststoffe, vol. 11, pp. 119-124, 2002 (with computer generated translation).
U.S. Appl. No. 10/581,684, filed Jun. 6, 2006, Stahl, et al.

* cited by examiner

*Primary Examiner*—Edward M Johnson
(74) *Attorney, Agent, or Firm*—Oblon, Spivak, McClelland, Maier & Neustadt, L.L.P.

(57) ABSTRACT

The invention discloses deagglomerated barium sulphate which has an average primary particle size of less than 0.5 μm and is coated with a dispersant. The dispersant has preferably reactive groups which are able to interact with the surface of the barium sulphate; particularly preferred dispersants are those which are able to endow the barium sulphate with a hydrophilic surface and have reactive groups for coupling to or into polymers. Also disclosed is a plastics premix comprising the deagglomerated, coated barium sulphate.

34 Claims, No Drawings

DEAGGLOMERATED BARIUM SULFATE

This application is a 371 of PCT/EP04/13612 filed Dec. 1, 2004.

The present invention relates to deagglomerated barium sulphate, to its preparation, to a plastics premix comprising barium sulphate, to the use of the deagglomerated barium sulphate in plastics, to plastics produced therewith, and to an intermediate.

The use of barium sulphate as a filler for plastics is already known. International patent application WO 00/14165 discloses the preparation of barium sulphate which is embedded in finely divided form in a carrier material. The particle size is 0.01 to 10 μm; it has good matting properties. Preparation takes place by means of wet fine grinding in the presence of the carrier material.

International patent application WO 02/30994 discloses the addition of an inorganic barium sulphate of this kind to base polymer materials prior to polymerization. The preferred average particle size $D_{50}$ of the inorganic solid embedded in the organic substance is 0.25 to 0.45 μm. The additive compositions are used in polyester and polyamide.

International patent application WO 00/57932 discloses materials for surgical application that contain what it refers to as nanocomposites. The filler particles can be treated with organic compounds in order to enhance their dispersibility, to reduce their propensity to agglomerate or aggregate, and to enhance the uniformity of the dispersion. Examples of compounds employed for this purpose include organic compounds such as the monomer of the surgical material under production, citrates or other compounds. Use may also be made of coupling agents such as organosilanes or of polymeric materials such as surfactants, an example being sodium dodecyl sulphate, but also of amphiphilic molecules, i.e. molecules which have a hydrophilic part and a hydrophobic part. Those specified include nonylphenol ethoxylates; bis(2-ethylhexyl) sulphosuccinate; hexadecyltrimethylammonium bromide, and phospholipids. The examples use either uncoated barium sulphate or particles coated with sodium citrate following precipitation.

One of the objects of the present invention was to specify a finely divided, deagglomerated barium sulphate which is redispersible even after drying, especially one which lends itself well to incorporation into plastics. A particular object was to provide a deagglomerated barium sulphate which, especially when incorporated into plastic, does not undergo reagglomeration. These and further objects are achieved by means of the present invention.

The deagglomerated barium sulphate of the invention, with an average (primary) particle size <0.5 μm, comprises a crystallization inhibitor and a dispersant. Preferred deagglomerated barium sulphate has an average (primary) particle size of <0.1 μm, in particular <0.08 μm (i.e. 80 nm), with very particular preference <0.05 μm (i.e. 50 nm), more preferably still <0.03 μm (i.e. 30 nm). Outstanding particles are those with sizes <20 μm, especially those with an average primary particle size of <10 nm. The lower limit on the primary particle size is for example 5 nm, but may also be even lower. The average particle sizes in question are those determined by XRD or laser diffraction methods. A preferred barium sulphate is obtainable by precipitating barium sulphate in the presence of a crystallization inhibitor in the presence of a dispersant and/or deagglomerating the barium sulphate following precipitation in the presence of a dispersant.

The amount of crystallization inhibitor and dispersant in the deagglomerated barium sulphate is flexible. Per part by weight of barium sulphate it is possible for there to be up to 2 parts by weight, preferably up to 1 part by weight, each of crystallization inhibitor and dispersant. Crystallization inhibitor and dispersant are present preferably in an amount of 1% to 50% by weight each in the deagglomerated barium sulphate. The amount of the barium sulphate present is preferably from 20% to 80% by weight.

It is known that in the course of its conventional preparation barium sulphate forms agglomerates ("secondary particles") made up of primary particles. The term "deagglomerated" in this context does not mean that the secondary particles have been broken down completely into primary particles which exist in isolation. It means that the secondary barium sulphate particles are not in the same agglomerated state in which they are typically produced in precipitations, but instead are in the form of smaller agglomerates. The deagglomerated barium sulphate of the invention preferably contains agglomerates (secondary particles) at least 90% of which have a particle size of less than 2 μm, preferably less than 1 μm. With particular preference at least 90% of the secondary particles are smaller than 250 nm, with very particular preference smaller than 200 nm. More preferably still at least 90% of the secondary particles are smaller than 130 nm, with particular preference smaller than 100 nm, with very particular preference smaller than 80 nm; more preferably still 90% of the secondary particles have a size of <50 nm, and even <30 nm. In part or even in substantial entirety the barium sulphate is in the form of unagglomerated primary particles. The average particle sizes in question are those determined by XRD or laser diffraction methods.

Preferred crystallization inhibitors have at least one anionic group. The anionic group of the crystallization inhibitor is preferably at least one sulphate, at least one sulphonate, at least two phosphate, at least two phosphonate or at least two carboxylate group(s).

Crystallization inhibitors present may be, for example, substances that are known to be used for this purpose, examples being relatively short-chain or else longer-chain polyacrylates, typically in the form of the sodium salt; polyethers such as polyglycol ethers; ether sulphonates such as lauryl ether sulphonate in the form of the sodium salt; esters of phthalic acid and of its derivatives; esters of polyglycerol; amines such as triethanolamine; and esters of fatty acids, such as stearic esters, as specified in WO 01/92157.

As crystallization inhibitor it is also possible to use a compound or a salt of the formula (I) having a carbon chain R and n substituents [A(O)OH]

in which

R is an organic radical which has hydrophobic and/or hydrophilic moieties,

R being a low molecule mass, oligomeric or polymeric, optionally branched and/or cyclic carbon chain which optionally contains oxygen, nitrogen, phosphorus or sulphur heteroatoms, and/or being substituted by radicals which are attached via oxygen, nitrogen, phosphorus or sulphur to the radical R, and A being C, P(OH), OP(OH), S(O) or OS(O), and n being 1 to 10000.

In the case of monomeric or oligomeric compounds, n is preferably 1 to 5.

A corresponding barium sulphate having an average primary particle size <50 nm, preferably <30 nm, in particular <20 nm, very particularly <10 nm, is likewise new and as an intermediate is provided by the invention. The intermediate preferably has a BET surface area of at least 30 m²/g, in particular at least 40 m²/g, more preferably of at least 45 m²/g and with very particular preference of at least 50 m²/g.

Useful crystallization inhibitors of this kind include hydroxy-substituted carboxylic acid compounds. Highly useful examples include hydroxy-substituted monocarboxylic and dicarboxylic acids having 1 to 20 carbon atoms in the chain (reckoned without the carbon atoms of the COO groups), such as citric acid, malic acid (2-hydroxybutane-1,4-dioic acid), dihydroxysuccinic acid and 2-hydroxyoleic acid, for example. Very particular preference is given to citric acid and polyacrylate as crystallization inhibitor.

Also extremely useful are phosphonic acid compounds having an alkyl (or alkylene) radical with a chain length of 1 to 10 carbon atoms. Useful compounds in this context are those having one, two or more phosphonic acid radicals. They may additionally be substituted by hydroxyl groups. Highly useful examples include 1-hydroxyethylenediphosphonic acid, 1,1-diphosphonopropane-2,3-dicarboxylic acid and 2-phosphonobutane-1,2,4-tricarboxylic acid. These examples show that compounds having not only phosphonic acid radicals but also carboxylic acid radicals are likewise useful.

Also very useful are compounds which contain 1 to 5 or an even greater number of nitrogen atoms and also 1 or more, for example up to 5, carboxylic acid or phosphonic acid radicals and which are optionally substituted additionally by hydroxyl groups. These include, for example, compounds having an ethylenediamine or diethylenetriamine framework and carboxylic acid or phosphonic acid substituents. Examples of highly useful compounds include diethylentriaminepentakis (methanephosphonic acid), iminodisuccinic acid, diethylenetriaminepentaacetic acid and N-(2-hydroxyethyl)ethylenediamine-N,N,N-triacetic acid.

Also very useful are polyamino acids, an example being polyaspartic acid.

Also extremely useful are sulphur-substituted carboxylic acids having 1 to 20 carbon atoms (reckoned without the carbon atoms of the COO group) and 1 or more carboxylic acid radicals, an example being sulphosuccinic acid bis-2-ethylhexyl ester (dioctyl sulphosuccinate).

It is of course also possible to use mixtures of the additives, including mixtures, for example, with further additives such as phosphorous acid.

The preparation of the above-described barium sulphate intermediate with the crystallization inhibitors of the formula (I) is advantageously carried out by precipitating the barium sulphate in the presence of the envisaged crystallization inhibitor. It can be advantageous if at least part of the inhibitor is deprotonated; for example, by using the inhibitor at least in part, or entirely, as an alkali metal salt, a sodium salt for example, or as an ammonium salt. Naturally it is also possible to use the acid and to add a corresponding amount of the base, or in the form of an alkali metal hydroxide solution.

The deagglomerated barium sulphate of the invention comprises not only the crystallization inhibitor but also an agent which has a dispersing action. This dispersant prevents the formation of undesirably large agglomerates when added during the actual precipitation. As will be described later on below, it can also be added in a subsequent deagglomeration stage; it prevents reagglomeration and ensures that agglomerates are readily redispersed.

The dispersant preferably has one or more anionic groups which are able to interact with the surface of the barium sulphate. Preferred groups are the carboxylate group, the phosphate group, the phosphonate group, the bisphosphonate group, the sulphate group and the sulphonate group.

Dispersants which can be used include some of the above-mentioned agents which as well as a crystallization inhibitor effect also have a dispersing effect. When agents of this kind are used it is possible for crystallization inhibitor and dispersant to be identical. Suitable agents can be determined by means of routine tests. The consequence of agents of this kind with a crystallization inhibitor and dispersing effect is that the precipitated barium sulphate is obtained as particularly small primary particles and forms readily redispersible agglomerates. Where an agent of this kind having both crystallization inhibitor and dispersing effect is used, it may be added during the precipitation and, if desired, deagglomeration may additionally be carried out in its presence.

It is usual to use different compounds having crystallization inhibitor action and dispersing action.

Very advantageous deagglomerated barium sulphate of the invention is that comprising dispersants of a kind which endow the barium sulphate particles with a surface which prevents reagglomeration and/or inhibits agglomeration electrostatically, sterically, or both electrostatically and sterically. Where such a dispersant is present during the actual precipitation, it inhibits the agglomeration of the precipitated barium sulphate, so that deagglomerated barium sulphate is obtained even at the precipitation stage. Where such a dispersant is incorporated after the precipitation, as part of a wet-grinding operation, for example, it prevents the reagglomeration of the deagglomerated barium sulphate after the deagglomeration. Barium sulphate comprising a dispersant of this kind is especially preferred on account of the fact that it remains in the deagglomerated state.

A particularly advantageous deagglomerated barium sulphate is characterized in that the dispersant has carboxylate, phosphate, phosphonate, bisphosphonate, sulphate or sulphonate groups which are able to interact with the barium sulphate surface, and in that it has one or more organic radicals $R^1$ which have hydrophobic and/or hydrophilic moieties.

Preferably $R^1$ is a low molecular mass, oligomeric or polymeric, optionally branched and/or cyclic carbon chain which optionally contains oxygen, nitrogen, phosphorus or sulphur heteroatoms and/or is substituted by radicals which are attached via oxygen, nitrogen, phosphorus or sulphur to the radical $R^1$ and the carbon chain is optionally substituted by hydrophilic or hydrophobic radicals. One example of substituent radicals of this kind are polyether groups. Preferred polyether groups have 3 to 50, preferably 3 to 40, in particular 3 to 30 alkyleneoxy groups. The alkyleneoxy groups are preferably selected from the group consisting of methyleneoxy, ethyleneoxy, propyleneoxy and butyleneoxy groups.

Preferred barium sulphate of the invention comprises a dispersant which has groups for coupling to or into polymers. These may be groups which bring about this coupling chemically, examples being OH groups or NH groups or $NH_2$ groups. The groups in question may also be groups which bring about physical coupling.

An example of a dispersant which renders the surface of the barium sulphate hydrophobic is represented by phosphoric acid derivatives in which one oxygen atom of the P(O) group is substituted by a C3-C10 alkyl or alkenyl radical and a further oxygen atom of the P(O) group is substituted by a polyether function. A further acidic oxygen atom of the P(O) group is able to interact with the barium sulphate surface.

The dispersant may be, for example, a phosphoric diester having a polyether group and a C6-C10 alkenyl group as moieties. Phosphoric esters with polyether/polyester side chains such as Disperbyk®111, phosphoric ester salts with polyether/alkyl side chains such as Disperbyk®102 and 106, substances having a deflocculating effect, based for example on high molecular mass copolymers with groups possessing pigment affinity, such as Disperbyk®190, or polar acidic esters of long-chain alcohols, such as Disperplast®1140, are further highly useful types of dispersants.

A barium sulphate having especially good properties comprises as dispersant a polymer which has anionic groups which are able to interact with the surface of the barium sulphate, examples being the groups specified above, and is substituted by polar groups, such as by hydroxyl or amino groups. Preferably there are polyether groups present which are terminally substituted by hydroxyl groups. As a result of this substitution the barium sulphate particles are externally hydrophilicized. Barium sulphate of this kind, of the invention, exhibits no propensity to reagglomerate. In the course of the application there may even be further deagglomeration. The polar groups, especially hydroxyl groups and amino groups, represent reactive groups which are suitable for coupling on or into epoxy resins in particular. Especially good properties are exhibited by a barium sulphate coated with a dispersant which has a multiplicity of polycarboxylate groups and a multiplicity of hydroxyl groups and also has further substituents which are sterically bulky, examples being polyether groups. A very preferred group of dispersants are polyether polycarboxylates substituted terminally on the polyether groups by hydroxyl groups.

Barium sulphate of this kind, having a crystal growth inhibitor and one of the particularly preferred dispersants that prevents reagglomeration sterically, especially a dispersant substituted by polar groups as described above, has the great advantage that it comprises very fine primary particles and comprises secondary particles whose degree of agglomeration is low at most, these particles, since they are readily redispersible, having very good application properties—for example, they can be incorporated readily into polymers and do not tend towards reagglomeration, and indeed even undergo further deagglomeration in the course of the application.

In one embodiment the deagglomerated coated barium sulphate is in dry form. In a further embodiment it is in the form of a suspension in water or in the form of a suspension in an organic liquid, the organic liquid being able optionally also to contain water. Preferred organic liquids are alcohols such as isopropanol or mixtures thereof with other alcohols or polyols, ketones such as acetone, cyclopentanone or methyl ethyl ketone, naphtha or special-boiling-point spirit, and mixtures thereof. Plasticizers such as dioctyl phthalate or diisodecyl phthalate may be admixed. Within the suspension the deagglomerated barium sulphate is present preferably in an amount of 0.1% to 60% by weight, such as 0.1% to 25% by weight or 1% to 20% by weight, for example.

The deagglomerated barium sulphate of the invention and particularly its suspension, especially when on an aqueous basis, may further comprise modifiers which influence its properties. The additional modifier, where present, preferably has a lower hydrodynamic volume than the compound used as dispersant. The modifier (M) is preferably of low molecular mass; in particular it contains at least one, especially one, of the anionic groups described above. Examples of especially suitable modifiers (M) are organic acids, preferably acetic acid and propionic acid, especially acetic acid. It has been found that suspensions of the deagglomerated barium sulphate, especially aqueous suspensions which contain organic acid, are particularly stable towards sedimentation.

Also an inventive product is barium sulphate with an average primary particle size <50 nm, preferably <20 nm, which is in substantially agglomerate-free form, and in which the average secondary particle size is therefore not more than 30% greater than the average primary particle size.

The invention provides a number of variants which make the deagglomerated barium sulphate of the invention available.

The first variant envisages precipitating barium sulphate in the presence of a crystallization inhibitor and then carrying out a deagglomeration. This deagglomeration is carried out in the presence of a dispersant.

The second version envisages precipitating barium sulphate in the presence of a crystallization inhibitor and a dispersant.

The first variant is now elucidated in more detail.

Barium sulphate is precipitated by typical methods, such as by reacting barium chloride or barium hydroxide with alkali metal sulphate or sulphuric acid. In the course of this precipitation methods are employed in which primary particles are formed with the fineness indicated above. In the course of the precipitation, additives are employed which inhibit crystallization, examples being those as specified in WO 01/92157, or the aforementioned compounds of the formula (I) which have a crystallization inhibitor effect. The precipitated barium sulphate is dewatered if desired to the paste state or even to the state of a dry powder. This is followed by wet deagglomeration. The liquid chosen may be water or an organic liquid, an alcohol for example. The deagglomeration, which is carried out for example in a bead mill, then takes place in the presence of a dispersant. The dispersants have been specified above; it is possible, for example, to use an agent of the formula (I) that has dispersing properties. In this case the crystallization inhibitor and the dispersant may be the same. The crystallization inhibitor effect is utilized in the course of the precipitation, the dispersing effect in the course of the deagglomeration. For the deagglomeration it is preferred to use those dispersants which prevent reagglomeration sterically, especially those dispersants which are substituted by hydroxyl groups. The grinding and hence the deagglomeration are carried out until the desired degree of deagglomeration has been reached. The deagglomeration is preferably carried out until the deagglomerated barium sulphate of the invention has secondary particles of which 90% are smaller than 2 μm, preferably smaller than 1 μm, more preferably smaller than 250 nm, with very particular preference smaller than 200 nm. With even greater preference deagglomeration is carried out until 90% of the secondary particles are smaller than 130 nm, with particular preference smaller than 100 nm, with very particular preference smaller than 80 nm, more preferably still <50 nm. The barium sulphate in this case may in part or even in substantial entirety be present in the form of unagglomerated primary particles (average particle sizes, determined by XRD or laser diffraction methods). The suspension of deagglomerated barium sulphate, comprising a crystallization inhibitor and a dispersant, that is formed in the course of the wet deagglomeration can then be used as it is, for incorporation into plastics, for example. As described above, it is also possible to produce a storage-stable suspension by addition of acid.

Another possibility is to carry out a drying operation, by spray drying for example. The particles formed in such an operation break down again very readily into the deagglomerated barium sulphate. The barium sulphate of the invention is formed of very small primary particles, the secondary particles are in a deagglomerated state, and it is redispersible.

The second variant of the invention envisages carrying out the precipitation, for example by reacting barium chloride or barium hydroxide with alkali metal sulphate or sulphuric acid, in the presence of a crystallization inhibitor and a dispersant; this procedure leads to the formation of readily redispersible deagglomerated barium sulphate during the actual precipitation. Dispersants of this kind, which endow the barium sulphate particles with a surface which prevents reagglomeration and inhibits agglomeration during the precipitation electrostatically, sterically, or both electrostatically and sterically, have been elucidated earlier on above. This embodiment produces a barium sulphate deagglomerated within the meaning of the invention as early as during the precipitation stage.

The thus-precipitated barium sulphate, comprising crystallization inhibitor and dispersant, is ready to use, in principle, and can be employed as an aqueous suspension; as described above, additional stabilization of the suspension with acid is possible. The precipitated barium sulphate can also be partly or wholly dewatered, by means of spray drying, for example. The product then is a paste or a powder. The powder, of course, contains agglomerates. These agglomerates, however, are not of the same nature as in prior-art barium sulphate, but instead are relatively loose agglomerates which are redispersible in liquid media to form deagglomerated particles again. Alternatively the powder can be converted into a suspension with the addition of water or organic liquids; in this case as well the deagglomerated particles as were present prior to drying are obtained again. In certain applications there is no need to comminute the dry aggregates or convert them into a suspension prior to application, since they undergo transformation into the deagglomerated particles in the course of the application—for example, when they are incorporated into liquid precursor products. If the especially preferred polymeric dispersants are employed that prevent reagglomeration sterically and have polar groups for coupling to or into polymers, then a further deagglomeration is observed, indeed.

The deagglomerated barium sulphate of the invention, in the form of a readily redispersible powder, alternatively, if desired, in the form of an aqueous suspension or in the form of a suspension in an organic liquid, can be used for all of the purposes for which barium sulphate is typically used, such as in plastics such as plastomers and elastomers, for example. It is particularly suitable for use as an addition to curable compositions and cured compositions, which include adhesives and sealants among others.

Curable compositions which comprise nanoparticles, especially silica- or alumina-based nanoparticles, have been known for some time. Reference is made by way of example to patent applications EP 1 179 575 A 2, WO 00/35599 A, WO 99/52964 A, WO 99/54412 A, WO 99/52964 A, DE 197 26 829 A 1 or DE 195 40 623 A 1. They serve in particular for the production of highly scratch-resistant coatings whose chemical stability, however, leaves something to be desired.

European patent application EP 0 943 664 A 2 discloses transparent film-forming binders which comprise nanoparticles and which, based on the film-forming solids, contain 0.5% to 25% by weight of primarily nanoscale particles which are incorporated in solid form, the binders being prepared by nozzle jet dispersion of the nanoscale particles in the binder. The greater ease of incorporation of the nanoparticles increases the scratch resistance of the cured compositions produced from the cured film-forming binders. Besides numerous other species, barium sulphate nanoparticles are among those which can be used. Whether these nanoparticles are surface-modified or not, and what effect they exert on the gloss, transparency, clarity, flow, surface qualities, scratch resistance and chemical resistance, are not apparent from the European patent application.

The new, curable compositions have at least one curable constituent (A), selected from the group consisting of low molecular mass compounds, oligomers and polymers, and also the deagglomerated barium sulphate of the invention.

A new process for preparing the curable compositions of the invention envisages mixing
(1) at least one curable constituent (A) selected from the group consisting of low molecular mass compounds, oligomers and polymers with
(2) a suspension of
  (2.1) deagglomerated barium sulphate nanoparticles of the invention
  (2.2) in an aqueous phase and homogenizing the resulting mixture.

Even where the amount of deagglomerated barium sulphate is high and the solids content is more than 30%, the curable compositions obtained in this process have very good transport properties and storage stability and can be processed further to very good effect. For instance, they can be applied very effectively to substrates. The curable compositions can be employed in any of a very wide variety of fields of application, particularly as coating materials, adhesives and sealants and as starting materials for mouldings and self-supporting sheets. The cured compositions produced from the curable compositions and comprising the deagglomerated barium sulphate of the invention have high gloss, very good flow, no stress cracks even at film thicknesses >40 μm, a surface free from defects, such as craters, bits, microbubbles and pinholes, and high scratch resistance. If the new cured compositions are optionally non-hiding, they are particularly transparent, clear and brilliant. Furthermore, they have a very good chemical resistance. Not least they shield substrates of all kinds effectively against high-energy radiation, especially X-rays. Furthermore, the new curable compositions can be prepared in a simple way.

The solids content of the curable compositions of the invention, i.e. the amount of constituents which construct the cured compositions of the invention produced from the curable compositions of the invention, may vary very widely and is guided by the requirements of the case in hand. The solids content is preferably 20% to 80%, more preferably 30% to 70% and in particular 30% to 60% by weight, based in each case on the curable composition of the invention.

The amount of the abovementioned constituents (A) in the curable compositions of the invention may likewise vary very widely and is also guided by the requirements of the case in hand. Preferably the amount is 50% to 99.9%, more preferably 60% to 99.9% and in particular 70% to 99.9% by weight, based in each case on the solids of the curable compositions of the invention.

Similarly the amount of surface-modified barium sulphate nanoparticles (N) in the curable compositions of the invention is very broad and is guided by the requirements of the case in hand. The amount is preferably 0.05% to 10%, more preferably from 0.05% to 8% and in particular 0.05% to 6% by weight, based in each case on the solids of the curable compositions of the invention.

The curable constituents (A) of low molecular mass are preferably epoxy-functional silanes, as disclosed for example by patent applications EP 1 179 575 A 2, WO 00/35599 A, WO 99/52964 A, WO 99/54412 A, DE 197 26 829 A 1 or DE 195 40 623 A 1, especially glycidyloxypropyltrimethoxysilane or glycidyloxypropyltriethoxysilane, and/or silanes which contain at least one olefinically unsaturated group, in particular a vinyl group or a methacrylate or acrylate group, as are known, for example, from patent applications WO 00/22052 A, WO 99/54412 A, DE 199 10 876 A 1 or DE 197 19 948 A 1, particularly the monomers (a2) described below.

The hydrolysates and/or condensates of these low molecular mass compounds may additionally be used as constituents (A).

The hydrolysates and/or condensates (A) are preparable by condensing the low molecular mass compounds (A) preferably as part of what is known as the sol-gel process. The basic reactions of this process can be elucidated with reference to tetraorthosilicates. These are hydrolysed and condensed optionally in the presence of a cosolvent:

hydrolysis:

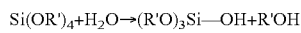

condensation:

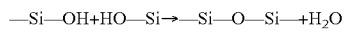

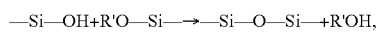

where R' can be an alkyl group, such as methyl or ethyl. The reactions are catalysed using acids, bases or fluoride ions.

The curable polymers and oligomers (A) contain at least one reactive functional group (a1) and preferably at least two and in particular at least three reactive functional groups (a1) which render the oligomers and polymers (A) curable thermally and/or with actinic radiation. Examples of suitable reactive functional groups (a1) are known from International patent application WO 03/016411 A, page 10 line 20 to page 12 line 2 and page 20 line 1 to page 22 line 16. Epoxide groups (a1) in particular are used.

The oligomers and polymers (A) are preferably hydrolysates and/or condensates preparable by hydrolysing and/or condensing oligomers and/or polymers (A) which contain epoxide groups (a1) and hydrolysable silane groups (a2).

The oligomers and/or polymers (A) which contain epoxide groups (a1) and hydrolysable silane groups (a2) may alternatively be used in the form of curable constituents (A).

The hydrolysates and/or condensates (A) are preparable by condensing oligomers and/or polymers (A) containing epoxide groups and hydrolysable silane groups (a2) preferably as part of what is called the sol-gel process, the basic reactions of which are described above.

The oligomers (A) contain on average more than 2 and not more than 15 incorporated monomers units. Generally speaking the polymers (A) contain more than 10, preferably more than 15, incorporated monomer units.

The hydrolysates and/or condensates (A) are preparable in each case from at least one, especially one, oligomer (A) or polymer (A) containing hydrolysable silane groups (a2). For particular applications, however, it is also possible to use mixtures of at least two different oligomers (A), polymers (A) or oligomers and polymers (A) that contain hydrolysable silane groups (a2).

The oligomers and polymers (A) containing hydrolysable silane groups (a2) contain in each case at least one epoxide group (a1) and at least one silane group (a2) hydrolysable in the sense referred to above. Preferably they contain on average at least two, in particular at least three, epoxide groups (a1) and at least two, in particular at least three, hydrolysable silane groups (a2). These may be terminal and/or lateral epoxide groups (a1) and hydrolysable silane groups (a2).

The oligomers and polymers (A) containing hydrolysable silane groups (a2) may have a construction which is linear, which has star-shaped or dendrimeric branching or which has a comb form. Within one oligomer or polymer (A) containing hydrolysable silane groups (a2) it is possible for these structures to be present in combination with one another. In that case the monomer units may have a random, alternating or blocklike distribution, and within one oligomer or polymer (A) containing hydrolysable silane groups (a2) these distributions may be present in combination with one another.

The number-average and mass-average molecular weights and the molecular-weight polydispersity of the oligomers and polymers (A') may vary widely and are guided by the requirements of the case in hand. The number-average molecular weight (determined using gel permeation chromatography with polystyrene as internal standard) is preferably 800 to 3000, more preferably 1000 to 2500 and in particular 1000 to 2000 daltons. The mass-average molecular weight is preferably 1000 to 8000, more preferably 1500 to 6500 and in particular 1500 to 6000 daltons. Polydispersity is preferably <10, more preferably <8 and in particular <5.

The oligomers and polymers (A) containing hydrolysable silane groups (a2) may come from any of the polymer classes in the course of whose preparation and thereafter the epoxide groups (a1) and the hydrolysable silane groups (a2) are not reacted. The skilled person is therefore able easily to select the appropriate classes of polymer on the basis of his or her general art knowledge. The oligomers and polymers (A) containing hydrolysable silane groups (a2) are preferably addition polymers, especially copolymers of olefinically unsaturated monomers.

The epoxide groups (a1) are connected covalently to the main chain or main chains of the oligomers and polymers (A) containing hydrolysable silane groups (a2) by way of linking organic groups (G1). It is possible in this context for one epoxide group (a1) to be linked to the main chain via one divalent linking organic group (G1) or for at least two epoxide groups (a1) to be linked to the main chain via an at least trivalent linking organic group (G1). Preferably one epoxide group (a1) is linked to the main chain via one divalent linking organic group (G1).

The divalent linking organic groups (G1) preferably contain at least one, especially one, at least divalent, in particular divalent, groups (G11) selected from the group consisting of substituted and unsubstituted, preferably unsubstituted, branched and unbranched, preferably unbranched, cyclic and non-cyclic, preferably non-cyclic, alkyl, alkenyl and alkynyl groups, especially alkyl groups, and also substituted and unsubstituted, preferably unsubstituted, aryl groups, or they consist thereof.

In particular the divalent group (G11) is an unbranched, non-cyclic, unsubstituted, divalent alkyl group having 1 to 10, preferably 2 to 6 and in particular 1 to 4 carbon atoms, such as a methylene, ethylene, trimethylene or tetramethylene group.

The divalent linking organic groups (G1) preferably further contain at least one, especially one, at least divalent, in particular divalent, linking functional group (G12), preferably selected from the group consisting of ether, thioether, carboxylate, thiocarboxylate, carbonate, thiocarbonate, phosphate, thiophosphate, phosphonate, thiophosphonate, phosphite, thiophosphite, sulphonate, amide, amine, thioamide, phosphoramide, thiophosphoramide, phosphonamide, thiophosphonamide, sulphonamide, imide, hydrazide, urethane, urea, thiourea, carbonyl, thiocarbonyl, sulphone or sulphoxide groups, especially carboxylate groups.

Examples of suitable substituents are halogen atoms, especially fluorine atoms and chlorine atoms, nitrile groups, nitro groups or alkoxy groups. The above-described groups (G1) and (G11) are preferably unsubstituted.

The epoxide groups (a1) are preferably joined to the main chain via a group (G11) and this in turn via a group (G12), more preferably in accordance with the general formula I:

Use is made in particular as group of the general formula I of

The hydrolysable silane groups (a2) may have different structures. They are preferably selected from the group consisting of hydrolysable silane groups (a2) of the general formula II:

$$-SiR_mR^1_n \qquad (II).$$

In the general formula II the definition of the indices and the variables is as follows:
R is a monovalent hydrolysable atom or monovalent hydrolysable group;
$R^1$ is a monovalent, non-hydrolysable radical;
m is an integer from 1 to 3, preferably 3, and
n is 0 or 1 or 2, preferably 0 or 1,
with the proviso that m+n=3.

Examples of suitable monovalent hydrolysable atoms R are hydrogen, fluorine, chlorine, bromine and iodine.

Examples of suitable monovalent hydrolysable radicals R are hydroxyl groups, amino groups —NH2 and groups of the general formula III:

$$R'-X- \qquad (III),$$

where the variables have the following definition:
X is oxygen atom, sulphur atom, carbonyl group, thiocarbonyl group, carboxyl group, thiocarboxylic acid S-ester group, thiocarboxylic acid O-ester group or amino group —NH— or —NR$^1$—, preferably oxygen atom; and
$R^1$ is a monovalent organic radical.

The monovalent organic radical $R^1$ contains or consists of at least one group (G2) selected from the group consisting of substituted and unsubstituted, preferably unsubstituted, branched and unbranched, preferably unbranched, cyclic and non-cyclic, preferably non-cyclic, alkyl, alkenyl and alkynyl groups, preferably alkyl groups, and also substituted and unsubstituted aryl groups; in particular unsubstituted, unbranched, non-cyclic alkyl groups.

Examples of suitable substituents are those specified above.

Where the radical $R^1$ is composed of a group (G2) this group is monovalent.

Where the radical $R^1$ contains a group (G2) this group is at least divalent, in particular divalent, and is linked directly to —X—. Furthermore the radical $R^1$ may contain at least one, especially one, of the groups (G12) described above.

Where the radical $R^1$ contains at least two groups (G2) at least one of them is at least divalent, especially divalent, and is linked directly to —X—. This group (G2) linked directly to —X— is linked to at least one further group (G2). Preferably this group (G2) linked directly to —X— is linked to the further group (G2) via a group (G12) or to the further groups (G2) via at least two groups (G12).

The radical $R^1$ is preferably composed of a group (G2). In particular the radical $R^1$ is selected from the group consisting of methyl, ethyl, propyl and butyl.

The hydrolysable silane groups (a2) are selected in particular from the group consisting of trimethoxysilyl, triethoxysilyl, tripropoxysilyl and tributoxysilyl, in particular trimethoxysilyl and triethoxysilyl.

The hydrolysable silane groups (a2) are joined covalently to the main chain or main chains of the oligomers and polymers (A) preferably by way of the linking organic groups (G1) described above. In this case one hydrolysable silane group (a2) may be linked to the main chain via one divalent linking organic group (G1) or at least two hydrolysable silane groups (a2) may be linked to the main chain via an at least trivalent linking organic group (G1). Preferably one hydrolysable silane group (a2) is linked to the main chain via one divalent linking organic group (G1).

Here as well the monovalent linking organic groups (G1) preferably contain at least one, especially one, of the above-described at least divalent, especially divalent, groups (G11) or are composed thereof. The divalent linking organic groups (G1) preferably further contain at least one, especially one, of the above-described at least divalent, especially divalent, linking functional groups (G12).

The silane groups (a2) are preferably linked to the main chain of the oligomers and polymers (A) via a divalent linking group (G11) and this in turn is linked via a divalent linking functional group (G12) in accordance with the general formula (IV):

$$-(-G12-)-(G11-)-SiR_mR^1_n \qquad (IV),$$

where the indices and variables are as defined above. Very particular preference is given to using the following groups of the general formula IV:

$$-C(O)-O-(-CH_2-)_2-Si(OCH_3)_3 \qquad (IV1),$$

$$-C(O)-O-(-CH_2-)_3-Si(OCH_3)_3 \qquad (IV2),$$

$$-C(O)-O-(-CH_2-)_2-Si(OC_2H_5)_3 \qquad (IV3),$$

$$-C(O)-O-(-CH_2-)_3-Si(OC_2H_5)_3 \qquad (IV4),$$

$$-C(O)-O-CH_2-Si(OC_2H_5)_3 \qquad (IV5)$$

and $$-C(O)-O-CH_2-SiCH_3(OC_2H_5)_2 \qquad (IV6),$$

especially (IV4).

The molar ratio of epoxide groups (a1) to hydrolysable silane groups (a2) in the oligomers and polymers (A') may vary widely. It is preferably 1.5:1 to 1:1.5, more preferably 1.3:1 to 1:1.3 and in particular 1.1:1 to 1:1.1.

Very particular advantage is possessed by the (meth)acrylate copolymers (A) which contain lateral and/or terminal epoxide groups (a1) and lateral and/or terminal hydrolysable silane groups (a2) of the general formula II:

$$-SiR_mR^1_n \qquad (II),$$

in which the indices and variables are as defined above, in an (a1):(a2) molar ratio of 1.5:1 to 1:1.5, preferably 1.3:1 to 1:1.3 and in particular 1.1:1 to 1:1.1. These (meth)acrylate copolymers (A') of the invention provide especially advantageous hydrolysates and/or condensates (A).

Besides the above-described epoxide groups (a1) and silane groups (a2) the oligomers and polymers (A) may also contain further lateral and/or terminal groups (a3). It is essential that the groups (a3) neither react with the epoxide groups (a1) and silane groups (a2) nor disrupt the progress of the condensation. Examples of suitable groups (a3) are fluorine atoms, chlorine atoms, nitrile groups, nitro groups, alkoxy groups, polyoxyalkylene groups or the above-described monovalent organic radicals $R^1$, especially aryl groups, alkyl groups and cycloalkyl groups. These groups (a3) allow the profile of properties of the oligomers and polymers (A) containing hydrolysable silane groups (a2) and hence of the hydrolysates and/or condensates (A) to be varied broadly in an advantageous way.

The oligomers and polymers (A) containing hydrolysable silane groups (a2) are preparable by copolymerization of at least one, especially one, monomer (a1) containing at least one, especially one, epoxide group (a1) with at least, especially one, monomer (a2) containing at least one, especially one, silane group (a2). The monomers (a2) and (a3) may additionally be copolymerized with at least one monomer (a3) containing at least one group (a3).

Particular advantages result when the monomers (a1) and (a2) are copolymerized with one another in an (a1):(a2) molar ratio of 1.5:1 to 1:1.5, preferably 1.3:1 to 1:1.3 and in particular 1.1:1 to 1:1.1. Very particular advantages are obtained if in this case the above-described molar ratio of epoxide groups (a1) to hydrolysable silane groups (a2) results in the oligomers and polymers (A').

The monomers (a1), (a2) and (a3) preferably contain at least one, especially one, olefinically unsaturated group.

Examples of suitable olefinically unsaturated groups are (meth)acrylate, ethacrylate, crotonate, cinnamate, vinyl ether, vinyl ester, dicyclopentadienyl, norbornenyl, isoprenyl, isopropenyl, allyl or butenyl groups, dicyclopentadienyl ether, norbornenyl ether, isoprenyl ether, isopropenyl ether, allyl ether or butenyl ether groups, or dicyclopentadienyl ester, norbornenyl ester, isoprenyl ester, isopropenyl ester, allyl ester or butenyl ester groups, preferably methacrylate groups and acrylate groups, especially methacrylate groups.

One example of an especially suitable monomer (a1) is glycidyl methacrylate.

One example of an especially suitable monomer (a2) is methacryloyloxypropyltrimethoxysilane (MPTS), sold under the brand name Dynasilan® MEMO by Degussa, or methacryloyloxymethyltriethoxysilane or methacryloyloxymethylmethyldiethoxysilane, sold under the brand names Geniosil® XL 34 and Geniosil® XL 36 by Wacker.

Examples of suitable monomers (a3) are described in International patent application WO 03/016411, page 24 line 9 to page 28 line 8.

The oligomers and polymers (A') are preferably preparable in a conventional manner by free-radical copolymerization of the monomers (a1) and (a2) and also, where appropriate, (a3), preferably in bulk (without solvent) or in solution, in particular in solution.

The hydrolysates and/or condensates (A) are preferably prepared by condensing the above-described oligomers and/or polymers (A) containing hydrolysable silane groups (a2), preferably at a pH<7. The hydrolysis and/or condensation takes place in a sol-gel process by reaction with water in the presence of an organic or inorganic acid, preferably an organic acid, particularly formic acid or acetic acid. The condensation is conducted at preferably −10 to +80, more preferably 0 to +80 and in particular +10 to +75° C.

The hydrolysis and/or condensation can be conducted in the presence of conventional, hydrolysable silanes of low molecular mass, which are different from the low molecular mass compounds (A), and/or of hydrolysable metal alkoxides, as described for example in German patent application DE 199 40 857 A 1, of the surface-modified barium sulphate nanoparticles (N) and/or of nanoparticles different from these.

The hydrolysates and/or condensates (A) can be processed further in solution or dispersion form or else used directly as curable compositions of the invention. Before their further processing to the curable compositions of the invention they are preferably freed largely from water and/or organic solvents.

As catalysts it is possible to add to the hydrolysates and/or condensates (A) and/or to the curable compositions of the invention compounds of metals with at least one organic, preferably nonaromatic, compound which is able to form chelate ligands, as catalysts. The compounds which form chelate ligands are organic compounds having at least two functional groups which are able to coordinate to metal atoms or metal ions. These functional groups are usually electron donors, which donate electrons to metal atoms or metal ions as electron acceptors. Suitable in principle are all organic compounds of the type stated, provided that they do not adversely affect, let alone prevent entirely, the crosslinking of the curable compositions of the invention to form cured compositions of the invention. Examples of suitable organic compounds are dimethylglyoxime or compounds containing carbonyl groups in positions 1 and 3, such as acetylacetone or ethyl acetoacetate. For further details refer to Römpp Chemie Lexikon, Georg Thieme Verlag, Stuttgart, 1989, volume 1, page 634. Aluminium chelate complexes in particular are used as catalysts.

The hydrolysates and/or condensates (A) and/or the curable compositions of the invention may further be admixed with conventional catalysts for the crosslinking of the epoxide groups, such as Lewis acids, aluminium compounds or tin compounds of amines or heterocycles, such as are described in, for example, the book by Bryan Ellis, "Chemistry and Technology of Epoxy Resins", University of Sheffield, Blackie Academic & Professional.

They may also be admixed with conventional constituents typical for coating materials. Examples of suitable constituents are described in, for example, International patent application WO 03/016411, page 14 line 9 to page 35 line 31.

The preparation of the curable compositions of the invention has no peculiarities in terms of method though can instead be carried out with the aid of the apparatus and techniques described in International patent application WO 03/016411, page 36 lines 13 to 20.

The curable compositions of the invention include conventional organic solvents (cf. International patent application WO 03/016411, page 35 lines 12 to 14) and also, preferably, water. It is a particular advantage of the liquid curable compositions of the invention that they can have a solids content >30% by weight without detriment thereby to their very good transportability, storage stability and processing properties, in particular their application properties.

The curable compositions of the invention serve for producing the cured compositions of the invention. They are preferably used as pigmented and unpigmented coating materials, especially clearcoat materials, and also as starting materials for mouldings, especially optical mouldings, and self-supporting sheets.

The cured compositions of the invention are preferably pigmented and unpigmented coatings and paint systems of high scratch resistance, more preferably transparent, especially clear, clearcoats, mouldings, especially optical mouldings, and self-supporting sheets. With very particular preference the cured compositions of the invention are highly scratch-resistant clearcoats, including highly scratch-resistant clearcoats as part of multicoat colour and/or effect paint systems, on conventional substrates (cf. in this respect International patent application WO 03/016411, page 41 line 6 to page 43 line 6 in conjunction with page 44 line 6 to page 45 line 6).

The production of the cured compositions of the invention from the curable compositions of the invention has no peculiarities in terms of method but is instead accomplished by means of conventional techniques and apparatus which are typical for the cured composition of the invention in question.

In particular the curable coating materials of the invention are applied to substrates by means of the conventional techniques and apparatus described in International patent application WO 03/016411, page 37 lines 4 to 24.

The curable compositions of the invention can be cured as described in International patent application WO 03/016411, page 38 line 1 to page 41 line 4.

The curable compositions of the invention provide new cured compositions, particularly coatings and paint systems, especially clearcoats, mouldings, especially optical mouldings, and self-supporting sheets which are highly scratch-resistant and chemically stable. The coatings and paint systems of the invention, especially the clearcoats, can be produced in particular even in thicknesses >40 µm without stress cracks occurring.

The cured compositions of the invention are therefore outstandingly suitable for use as highly scratch-resistant, decorative, protective and/of effect-imparting coatings and paint systems on bodies of means of transport of any kind (especially means of transport operated by muscle power, such as cycles, coaches or railroad trolleys; aircraft, such as aeroplanes, helicopters or airships; floating structures, such as ships or buoys; rail vehicles and motor vehicles, such as locomotives, railcars, railway wagons, motorcycles, buses, vans and lorries or passenger cars) or on parts thereof; on the interior and exterior of built structures; on furniture, windows and doors; on polymeric mouldings, especially those of polycarbonate, particularly CDs and windows, especially car windows; on small industrial parts, on coils, freight containers and packaging; on white goods; on sheets; on optical, electrical and mechanical components, and also on hollow glassware and articles of everyday use.

The coatings and paint systems of the invention, especially the clearcoats, can be employed in particular in the technologically and aesthetically particularly demanding field of automotive OEM finishing. There they are notable particularly for especially high carwash resistance and scratch resistance.

The deagglomerated barium sulphate of the invention is suitable not only as an additive for the curable compositions described above but also, generally, as an additive for, for example, plastics, e.g. phenolic resins, acrylic resins, alkyd resins, epoxy resins, saturated and unsaturated polyesters, polyurethanes, silicone resin, urea resin and melamine resin, polycarbonate and polyamide resin. Plastics with added modified barium sulphate of the invention are likewise provided by the invention.

The barium sulphate of the invention is suitable as stated as an additive for adhesives. Thus barium sulphate which had been precipitated using citric acid or Na polyacrylate as crystallization inhibitor and dispersed with a high molecular mass copolymer having groups possessing pigment affinity (Disperbyk®190) was added to an acrylate-based adhesive, the adhesive being thereby improved such that the cohesion was enhanced without the adhesion being altered. In the case of resin-based adhesives a combination of low viscosity and high hardness was obtained by addition of modified barium sulphate produced with citric acid-precipitated barium sulphate and subsequent dispersion by means of a salt of a phosphoric ester with polyether/alkyl side chains (Disperbyk®102) in special-boiling-point spirit/acetone. Citric acid-precipitated barium sulphate of this kind, produced with Disperbyk®102 in special-boiling-point spirit with addition of dioctyl phthalate, produced improved cohesion and chemical resistance in silicones. The modified barium sulphate was used in polyurethane/epoxy resins as well, on that occasion with dicetyl phthalate as an additive.

It has additionally been found that barium sulphate of the invention, especially that containing not only the crystallization inhibitor but also a polymeric polyether polycarboxylate dispersant substituted terminally on the ether groups by hydroxyl groups and so rendered hydrophilic, can be used with particular suitability for application in epoxy mouldings or epoxy resins. Indeed, it endows these plastics with good flexural impact strength and breaking extension.

Epoxy resins are organic compounds, generally oligomers, which have more than one epoxide group per molecule. These oligomeric compounds can be converted using suitable hardeners into thermosets. Epoxy resins are used for example as casting resins or else as laminates (in aircraft, vehicle or watercraft construction, for example).

Monoepoxide compounds used as starting material for preparing epoxy resins are, in particular, epichlorohydrin, but also glycidol, styrene oxide, cyclohexene oxide, and glycidyl acrylate and methacrylate. Resin is formed by reaction, especially with bisphenol A. For specific resins, other polyols, such as aliphatic glycols, are also suitable. Liquid resins may also be chain-extended by the "advancement" method. Examples of suitable curing agents include dicarboxylic anhydrides or amine hardeners. An elucidation of principles is found for example in Ullmanns Enzyklopädie der Technischen Chemie, 4th edition, vol. 10, pages 563-580 and in Kirk-Othmer, Encyclopedia of Chemical Technology, 4th edition, vol. 9, pages 730-755.

One of the uses of epoxy resin is for composite materials. These composite materials are constructed from matrix material and reinforcements. The matrix material used is predominantly epoxy resins. Reinforcing material is preferably fibrous; preferred materials are glass fibres, carbon fibres and aramid fibres. Fundamental information on these is found in Kirk-Othmer, Encyclopedia of Chemical Technology, 4th edition, vol. 7, pages 1-40. Composite materials with an epoxy matrix can be used in, for example, aircraft construction, spaceship construction, for satellites, vehicles, in railway construction, in watercraft construction, for architectural components, flywheels, and pressure vessels; see, for example, published U.S. patent application 2003/0064228 A1 and EP-A-1 094 087. Another field of application is that of rotors for wind turbines; see Kunststoffe 11 (2002), 119-124.

The barium sulphate of the invention is present in the cured epoxy resin preferably in an amount of 1% to 50% by weight, more preferably 1% to 25% by weight.

A cured epoxy resin is obtainable by dispersing the barium sulphate of the invention in a precursor of the cured epoxy resin, preferably in the hardener and/or in the resin (to which hardener has not yet been added; i.e., resin which is as yet uncured). This can be done using, for example, high-speed stirrers.

Highly suitable epoxides are those based on bisphenol A and epichlorohydrin. They may also include admixtures, examples being reaction products of bisphenol F and epichlorohydrin or glycidyl ethers, 1,6-hexanediol diglycidyl ether for example. Very useful epoxides are those with 50% to 100% by weight of bisphenol A/epichlorohydrin, 0% to 50% by weight, preferably 10% to 25% by weight of bisphenol F/epichlorohydrin and 0% to 50% by weight, preferably 10% to 25% by weight of 1,6-hexanediol glycidyl ether. One commercial product with such a composition is Epilox M730® resin.

Examples of highly suitable hardeners include those based on polyoxyalkylenamines. It is also possible to employ mixtures, examples being mixtures of the polyoxyalkylenamines with cyclohexanediamines or piperazinylethylamines. A very useful hardener, for example, is one with 50% to 100% by weight of polyoxyalkylenamine, 0% to 50% by weight, preferably 10% to 25% by weight, of 1,2-cyclohexanediamine (also as an isomer mixture) and 0% to 50% by weight, preferably 10% to 25% by weight, of 2-piperazin-1-ylethylamine. One commercial product with such a composition is Epilox M888®.

The cured epoxy resins may comprise further typical constituents such as, for example, curing accelerants or pigments.

Described below is a process for preparing the epoxy resins of the invention. It envisages deagglomerating barium sulphate of the abovementioned particle size<0.5 μm, in particular <0.1 μm, in a precursor of the cured epoxy resin. The deagglomeration of the barium sulphate is carried out preferably in the hardener, in the epoxy resin before it has been mixed with hardener, or in both. Mixing of the starting materials, at least one of which contains the deagglomerated, dispersed barium sulphate, such as mixing of resin and hardener, or mixing of the component containing barium sulphate with resin or hardener not containing barium sulphate, produces cured epoxy resin.

The cured epoxy resin can be used to produce a composite material which comprises the cured epoxy resin. The composites in question may be, for example, composites which contain fibres such as glass fibres, carbon fibres or aramid fibres in the matrix. They may also be laminates, where fibres or a woven fabric are added in a polymer matrix in individual layers.

The composites are produced by known methods, such as by wet lamination, by infusion or by way of prepregs.

For example, a mixture is produced from a precursor of the epoxy resin, preferably hardener and deagglomerated barium sulphate of the invention, having a particle size<0.5 μm, in particular <0.1 μm. The amount of barium sulphate in this mixture is preferably 0.1% to 50% by weight. Dispersant is present preferably in an amount of 0.5% to 50% by weight.

It is also possible to produce a mixture composed of hardener-free epoxy resin and deagglomerated barium sulphate having a particle size<0.5 μm, in particular <0.1 μm. Preferred particle sizes of the barium sulphate have been indicated earlier on above. The amount of barium sulphate in this mixture is preferably 0.1% to 50% by weight. Dispersant is present preferably in an amount of 0.5% to 50% by weight.

The composite material can be used as a construction material, for example in watercraft construction, in wind turbines, for pipe construction, for containers, in aircraft construction and in vehicle construction.

The material has the advantage that the flexural impact strength and breaking extension are enhanced in a desirable way, a factor which is particularly advantageous in the case of laminates, since the risk of delamination is reduced.

The examples which follow are intended to illustrate the invention without restricting it in its scope.

EXAMPLES

Example 1

Preparation of Finely Divided Barium Sulphate as an Intermediate by Precipitation in the Presence of Crystallization Inhibitors General Experimental Instructions:

a) Routine Experiment:
A high 600 ml glass beaker was charged with 200 ml of additive solution (containing 2.3 g of citric acid and 7.5 g of Melpers®0030) and 50 ml of sodium sulphate solution with a concentration of 0.4 mol/l. Stirring was carried out centrally in the solution by means of an Ultraturrax stirrer as dispersing aid at 5000 rpm. In the vortex region of the Ultraturrax the barium chloride solution (concentration: 0.4 mol/l) was supplied by means of a Dosimat automatic metering device.

b) Unit (V):
An apparatus was used as described in WO 01/92157, in which forces of thrust, shear and friction act on the reaction mixture; the additive was added in the initial charge of the sulphuric acid solution.

| trade name | chemical identity according to manufacturer | Amount of additive [%] | pH of suspension | BET value [m²/g] | XRD value d [nm] | d 50 without pretreatment of suspension [μm] |
|---|---|---|---|---|---|---|
| Citronensäure, Merck | citric acid | 7.5 | 12.43 | 75.2 | 22 | 0.287 |
| Citronensäure, Merck | citric acid | 15 | 7.13 | 73 | 18 | 0.142 |
| HEDP, Fluka | 1-hydroxyethylene-diphosphonic acid tetrasodium salt | 21.6 | 5.9 | 63.4 | 16 | 0.228 |
| Baypur CX 100/34% | iminodisuccinic acid sodium salt in aqueous solution | 15 | 9.6 | 55.9 | 22 | 1.281 |
| Dispex N40, Ciba | neutral sodium salt of a polycarboxylic acid (polyacrylate), molar weight approx. 3500 Da, lowest molar weight of the Dispex series | 3 | 12.85 | 53.9 | 28 | 0.167 |
| Citritex 85 Jungbunzlauer Ladenburg GmbH | Na salt of hydroxycarboxylic acids | 15 | 6.6 | 53.6 | 31 | 0.273 |
| HEDP | 1-hydroxyethylene-diphosphonic acid tetrasodium salt | 10.8 | 5.6 | 53.4 | 23 | 0.243 |
| DTPA-P, Fluka | diethylenetriaminepentakis (methanephosphonic acid) solution | 15 | 6.97 | 52.6 | 17 | 0.169 |
| DTPA | Diethylenetriaminepenta-acetic acid | 15 | 11.3 | 47.8 | 29 | 0.23 |
| DEVltec PAA | polyaspartic acid, Na salt, in aqueous solution | 15 | 5.73 | 47.7 | 18 | 0.296 |
| Dispex N40 | neutral sodium salt of a polycarboxylic acid (polyacrylate), molar weight approx. 3500 Da, lowest molar weight of the Dispex series | 15 | 10.67 | 46.6 | 19 | 0.167 |
| HEDTA | N-(2-hydroxyethyl)-ethylenediamine-N,N,N,-triacetic acid | 3.75 | 8.3 | 46.5 | 38 | 0.317 |
| 4334/HV, SKW | polycarboxylate, aqueous | 15 | 9.9 | 33 | 21 | 0.147 |
| Citronensäure | citric acid | 1.5 | 6.1 | 32.1 | 33 | 1.588 |

-continued

| trade name | chemical identity according to manufacturer | Amount of additive [%] | pH of suspension | BET value [m²/g] | XRD value d [nm] | d 50 without pretreatment of suspension [µm] |
|---|---|---|---|---|---|---|
| Dispex N40 | neutral sodium salt of a polycarboxylic acid (polyacrylate), molar weight approx. 3500 Da, lowest molar weight of the Dispex series | 15 | 10.08 | 32 | 21 | 0.2 |
| DTPA-P, Fluka | diethylenetriaminepentakis (methanephosphonic acid) solution | 5 | 11.38 | 31.5 | 29 | 0.197 |
| HEDP | 1-hydroxyethylene-diphosphonic acid tetrasodium salt | 15 | 2.99 | 30.3 | 34 | 0.364 |
| 4334/HV | polycarboxylate, aqueous | 15 | 6.84 | 30.2 | 23 | 0.152 |
| DTPA-P | diethylenetriaminepentakis (methanephosphonic acid) solution | 15 | 10.47 | 25.5 | 17 | 0.157 |
| Äpfelsäure, Merck | 2-hydroxybutane-1,4-dioic acid | 15 | 10.47 | 24.2 | 28 | 1.031 |
| Polymethacrylsäure 91 | polymethacrylic acid | 5 | 10.69 | 18.9 | 40 | 0.268 |
| Sokalan PA20 | polyacrylate | 15 | 6.31 | 15.7 | 22 | 0.251 |
| Dispers 715W | Na polyacrylate, aqueous | 15 | 5.99 | 15.1 | 19 | 0.18 |
| Hydropalat N | Na polyacrylate | 15 | 6.03 | 12.5 | 23 | 0.168 |
| VP 4334/8L | polycarboxylate, aqueous | 15 | 6.38 | 12.5 | 24 | 0.148 |
| Dispers 715W | Na polyacrylate, aqueous | 15 | 10.82 | 12.4 | 19 | 0.161 |

Example 2

Preparation of Deagglomerated Barium Sulphate

The barium sulphate prepared in Example 1 and containing citric acid as crystallization inhibitor was dried and subjected to wet grinding in a bead mill with addition of a dispersant. The dispersant used was a polyether polycarboxylate substituted terminally on the polyether groups by hydroxyl groups (Melpers type from SKW, molar weight approximately 20000, side chain 5800). A further dispersant that was used was a phosphoric ester having one free hydroxyl group.

The barium sulphate containing citric acid and deagglomerated using the hydroxy-terminated polyether polycarboxylate proved to be especially useful for application in epoxy resin. It was found that the deagglomerated product (secondary particle size<80 nm) underwent further deagglomeration in the course of processing.

Example 3

Preparation of Barium Sulphate by Precipitation in the Presence of Crystallization Inhibitors and Polymeric Dispersants During Precipitation Starting materials used were barium chloride and sodium sulphate.

3.1. Beaker Experiments:

A 200 ml graduated flask was charged with 7.77 g of the Melpers-type, terminally hydroxy-substituted polyether polycarboxylate (Melpers®0030) from SKW and made up to 200 ml with water. This quantity corresponded to 50% of Melpers (w=30%) based on the maximum amount of $BaSO_4$ formed (=4.67 g).

A 600 ml high glass beaker was charged with 50 ml of a 0.4 M $BaCl_2$ solution, to which 200 ml of the Melpers solution were added. To aid dispersion an Ultraturrax was immersed centrally into the glass beaker and operated at 5000 rpm. Within the vortex region created by the Ultraturrax 50 ml of a 0.4 M $Na_2SO_4$ solution to which citric acid had been added (50% of citric acid, based on the maximum amount of $BaSO_4$ formed: 2.33 g per 50 ml/$Na_2SO_4$) were added via a flexible tube, using a Disomat. Both the $BaCl_2$/Melpers solution and the $Na_2SO_4$/citric acid solution were rendered alkaline using NaOH prior to precipitation; the pH was approximately 11-12.

The resulting barium sulphate, obtained in deagglomerated form, possessed a primary particle size of approximately 10 to 20 nm; the secondary particle size was situated within the same range, and so the sulphate could be regarded as largely free of agglomerates. It was useful as a filler for the preparation of curable compositions and for epoxy resins.

3.2. Preparation of Deagglomerated Barium Sulphate on the Pilot Plant Scale

A 30 l vessel was charged with 5 l of a 0.4 M $BaCl_2$ solution. 780 g of the Melpers product were added with stirring (50%, based on maximum amount of $BaSO_4$ formed: 467 g). To this solution there were added 20 l of demineralized water. Operated within the vessel was an Ultraturrax, in whose vortex region 5 l of a 0.4 M $Na_2SO_4$ solution were added via a stainless steel pipe, using a peristaltic pump. The $Na_2SO_4$ solution had been admixed with citric acid beforehand (233 g/5 l $Na_2SO_4$=50% citric acid, based on maximum amount of $BaSO_4$ formed). As in the case of the beaker experiments, both solutions had been rendered alkaline by means of NaOH prior to precipitation in these experiments as well. The properties in respect of primary particle size and serviceability corresponded to those of the barium sulphate from Example 3.1. The sulphate was likewise largely free from agglomerates.

3.3. Preparation of Deagglomerated Barium Sulphate with Higher Reactant Concentrations Example 3.2 was repeated. On this occasion 1-molar solutions were used. The barium sulphate obtained corresponded to that of Example 3.2.

Example 4

Preparation of a Stabilized Suspension Containing 16% by Weight Barium Sulphate An approximately 1%, aqueous suspension (colloidal solution) of the deagglomerated barium sulphate prepared in accordance with Example 3.2 was first adjusted to a pH of 6 using 0.5 N acetic acid. Subsequently 10% by weight of a 0.5% strength ammonia solution were added, so that the resulting pH was 10. Thereafter the preparation was further concentrated on a rotary evaporator until a solids content of 16% by weight was reached. The resultant solution was stable for more than one week at room temperature and could be used for preparing curable compositions.

Example 5

Preparation of a Stabilized Suspension Containing 10% by Weight Barium Sulphate Example 4 was repeated in the same way except that concentration took place only to a level of 10% by weight barium sulphate. The suspension was stable for more than three weeks.

Example 6

Preparation of Barium Sulphate with Grinding 6.1. Preparation of Chemically Dispersed Barium Sulphate by Precipitation in the Presence of Crystallization Inhibitors and Subsequent Grinding in the Presence of Polymeric Dispersants Starting materials used were barium chloride and sodium sulphate. Barium chloride solution and sodium sulphate solution were reacted in the presence of citric acid as crystallization inhibitor, with precipitation of barium sulphate. The precipitated barium sulphate was dried and suspended in isopropanol, a polyether polycarboxylate substituted terminally on the polyether groups by hydroxyl groups (Melpers®0030) was added as dispersant and the sulphate was deagglomerated in a bead mill. The isopropanol was removed by evaporation. The barium sulphate contained about 7.5% by weight of citric acid and about 25% by weight of the polyether polycarboxylate.

6.2. Preparation using Other Starting Compounds and a Different Crystallization Inhibitor Example 6.1. was repeated. Barium chloride was replaced by barium hydroxide solution and sodium sulphate by sulphuric acid. Instead of citric acid 3% by weight of Dispex®N40 was used (a sodium polyacrylate). Melpers®0030 was used in an amount of 8.5% by weight.

Example 7

Preparation of the Premix Containing the Deagglomerated Barium Sulphate in Chemically Dispersed Form The deagglomerated barium sulphate prepared according to Example 6.2. was suspended in the hardener. Deagglomeration was observed.

Example 8

Application of the Barium Sulphate of the Invention in the Preparation of Epoxy Resin Deagglomerated barium sulphate, prepared as described in Example 6.2. using citrate and the hydroxyl-substituted, Melpers-type polyether carboxylate, was used as spray-dried powder. This powder proved to be readily redispersible in the epoxy resin precursors indicated below, and, indeed, further deagglomeration was observed. The powder was dispersed in accordance with Example 7 in the hardener.

The epoxy resin used was Epilox M730® from Leuna-Harze GmbH. The hardener used was Epilox M888®, likewise from Leuna-Harze GmbH.

In all of the experiments the cured epoxy resin was composed of 100 parts by weight of Epilox M730®, 24 parts by weight of Epilox M880® and 31 parts by weight of filler (when using the barium sulphate of the invention including crystallization inhibitor and dispersant).

The filler was dispersed in the resin or in the hardener.

Test sheets were produced for determination of the properties, the procedure being as follows:

Where a filler/hardener or filler/resin (dispersant) mixture was used, it was prepared beforehand as follows:

1. The filler, the filler/hardener (dispersant) mixture or the filler/resin (dispersant) mixture was weighed out into a dispersing vessel. The dispersing vessel is a vacuum dissolver having a mechanical stirrer with a very high rotational speed.
2. The dissolver vessel was evacuated to a pressure of approximately 0.1 bar absolute.
3. The resin/hardener mixture or the resin was weighed out into an initial-charge vessel and injected into the vacuum dissolver via a flexible tube with tube clamp.
4. The mixture in the vacuum dissolver was dispersed for 5 minutes.
5. Where appropriate, any further hardener and/or resin components were injected.
6. After the dissolver drive had been switched off, a waiting time of at least 2 minutes was observed and then the dissolver was exposed to atmosphere.
7. The resin/hardener/filler mixture was removed and injected into an evacuated, closed sheet mould for the formation of a sheet having a thickness of 4 mm.
8. Curing (with supply of heat where appropriate)
9. Demoulding
10. Heat treatment of the test sheet (12 h at 80° C.). The samples were sawn to size and investigated.

In the experiments the resin without addition of filler was identified as sheet 1. Sheet 2 was the resin with addition of 20% of Blanc Fixe Brillant® from Solvay Barium Strontium GmbH. Brillant has an average particle size of approximately 0.8 µm. This filler was dispersed directly into the resin. Sheet 3 is a resin in which 20% by weight of ultrafine barium sulphate was dispersed directly in the resin, without addition of a dispersant. This barium sulphate had an average particle size of 0.15 µm.

Sheet 4 contained the resin with 20% by weight of ultrafine barium sulphate which had been chemically dispersed; its preparation and further processing to the premix are described in Examples 7 and 8. This means that the barium sulphate with a particle size in the range from 10 to 30 nm (primary particles) had been dispersed beforehand in the hardener. The mixture of dispersed barium sulphate and hardener was then incorporated as described above in the epoxy resin by mixing in the vacuum dissolver.

The test sheets were then subjected to the following investigations:

1. Tensile Test in accordance with DIN EN ISO 527

The test was carried out on dumbbells having a nominal cross-section of 10×4 mm². The parallel length was 60 mm.

The test took place under the boundary conditions of Table 1:

TABLE 1

Test parameters, tensile test

| Parameter | Unit | Value |
|---|---|---|
| Ambient temperature | °C. | 23 |
| Relative ambient humidity | % | 50 |
| Testing speed | mm/min. | 1.0 |
| Reference length of fine extensometer | mm | 50 |
| Lower reference extension for determination of elasticity modulus | % | 0.05 |
| Upper reference extension for determination of elasticity modulus | % | 0.25 |
| Method of calculation of elasticity modulus | — | regression |

TABLE 2

Test results, tensile test

| Material | Sheet | Tensile elasticity modulus MPa | Tensile strength MPa | Breaking extension % |
|---|---|---|---|---|
| EPILOX M730/M880 | 1 | 3391 | 71.77 | 3.6 |
| EPILOX M730/M888 + 20% Brillant | 2 | 3427 | 58.52 | 1.85 |
| EPILOX M730/M888 with 20% BaSO₄ (1870/V71a-ZTS) dispersed mechanically | 3 | 3811 | 62.45 | 1.85 |
| EPILOX M730/M888 with 20% BaSO₄ (1870/V71a-ZTS) dispersed chemically | 4 | 3133 | 63.58 | 8.62 |

2. Bending Test in accordance with DIN EN ISO 178

The test was carried out on flat rods having a nominal cross-section of 15×4 mm².

The test took place under the boundary conditions of Table 3.

TABLE 3

Test parameters, bending test

| Parameter | Unit | Value |
|---|---|---|
| Ambient temperature | °C. | 23 |
| Relative ambient humidity | % | 50 |
| Testing speed | mm/min. | 2.0 |
| Support width | mm | 64 |

TABLE 4

Test results, bending test

| Material | Sheet | Flexural elasticity modulus MPa | Flexural strength MPa |
|---|---|---|---|
| EPILOX M730/M880 | 1 | 3211 | 144.18 |
| EPILOX M730/M888 + 20% Brillant | 2 | 3463 | 99.03 |
| EPILOX M730/M888 with 20% BaSO₄ (1870/V71a-ZTS) dispersed mechanically | 3 | 3865 | 105.51 |
| EPILOX M730/M888 with 20% BaSO₄ (1870/V71a-ZTS) dispersed chemically | 4 | 3090 | 99.81 |

3. Flexural Impact Test in accordance with EN ISO 179 (Charpy, Unnotched)

The flexural impact test was carried out in the wide-side and narrow-side directions of stress on a pendulum impact mechanism with a support width of 62 mm.

TABLE 5

Results of the wide-side flexural impact test

| Material | Sheet | Flexural impact strength narrow side kJ/m² | Flexural impact strength wide side kJ/m² | Flexural impact strength average kJ/m² |
|---|---|---|---|---|
| EPILOX M730/M880 | 1 | 63.95 | 43.71 | 53.83 |
| EPILOX M730/M888 + 20% Brillant | 2 | 16.53 | 15.27 | 15.90 |
| EPILOX M730/M888 with 20% BaSO₄ (1870/V71a-ZTS) dispersed mechanically | 3 | 15.75 | 13.07 | 14.41 |
| EPILOX M730/M888 with 20% BaSO₄ (1870/V71a-ZTS) dispersed chemically | 4 | 60.06 | 67.43 | 63.75 |

The experiments show that the resin filled with nanoscale barium sulphate exhibits better properties than the material filled with the coarser Brillant product. Particularly noteworthy is the high flexural impact strength of sheet 4 with nanoscale barium sulphate containing crystallization inhibitor and dispersant and dispersed in the hardener beforehand. Indeed, the flexural impact strength of this material is even greater than that of the unfilled resin.

Hence not only is the barium sulphate of the invention advantageous from a performance standpoint but also it is able to impart outstanding properties to the application products.

Examples Relating to the Preparation of a Clearcoat Material

General Remarks:

The barium sulphate used was the surface-modified product of Example 3 in 1% by weight suspension or as a stabilized solution of Example 5.

Example 9

The Preparation of a Condensate (A)

A three-necked glass flask equipped with stirrer, reflux condenser, gas inlet and two feed vessels was charged with 534.63 parts by weight of ethoxypropanol and 59.37 parts by weight of propyl glycol. This initial charge was heated to 133° C. with stirring under nitrogen. Then the first feed, consisting of 380.26 parts by weight of glycidyl methacrylate and 664.27 parts by weight of methacryloyloxypropyltrimethoxysilane, and the second feed, consisting of 169.64 parts by weight of tert-butyl peroxy-2-ethylhexanoate, 172.64 parts by weight of ethoxypropanol and 19.18 parts by weight of propyl glycol, were metered in slowly to the initial charge, beginning simultaneously and with stirring. The first feed was metered in over two hours and the second feed over five hours. The resulting reaction mixture was subsequently polymerized at 130° C. for 1.5 hours with stirring. The resulting methacrylate copolymer (A') had a residual monomer content below the gas-chromatographic detection limit.

102.8 parts by weight of the methacrylate copolymer (A') were admixed with 184.3 parts by weight of isopropanol, 171.3 parts by weight of 2 N formic acid and 46.3 parts by weight of deionized water. The resulting reaction mixture was stirred at 70° C. for an hour and then admixed with 95.4 parts by weight of ethoxypropanol. Subsequently the low-boiling constituents were distilled off under reduced pressure at a maximum temperature of 70° C.

Examples 10.1 to 10.3 and Comparative Example C1

The Preparation of Clearcoat Materials 10.1 to 10.3 and C1 and also the Production of Clearcoats 1 to 3 and C1

Clearcoat materials 10.1 to 10.3 and C1 were prepared by mixing the constituents indicated in Table 6 and homogenizing the resulting mixtures. All four clearcoat materials were transparent and clear, transportable and stable on storage.

Clearcoat materials 10.1 to 10.3 and C1 were knifecoated onto glass panels and cured thermally at 140° C. for 22 minutes. Thermal curing was carried out using forced-air ovens from Heraeus.

This gave high-gloss, clear clearcoats 10.1 to 10.3 and C1, which exhibited very good levelling and were free from stress cracks and surface defects such as craters. Their scratch resistance was determined by means of the steel wool scratch test.

The steel wool scratch test was conducted using a hammer in accordance with DIN 1041 (weight without shaft: 800 g; shaft length: 35 cm). Prior to the test the test panels were stored at room temperature for 24 hours.

The flat side of the hammer was wrapped with a ply of steel wool and fastened at the raised sides using Tesakrepp tape. The hammer was placed at right angles onto the clearcoats. The weighted part of the hammer was guided, without tipping and without additional physical force, in a track over the surface of the clearcoat.

For each test, 10 strokes back and forth were executed by hand. After each of these individual tests the steel wool was replaced.

Following exposure, the test areas were cleaned of the residues of steel wool using a soft cloth. The areas under test were evaluated visually under artificial light and rated as follows:

| Rating | Damage |
|---|---|
| 1 | none |
| 2 | slight |
| 3 | moderate |
| 4 | moderate to medium |
| 5 | severe |
| 6 | very severe |

Evaluation took place immediately after the end of the test. The results are likewise found in Table 6.

TABLE 6

The physical composition and scratch resistance of clearcoat materials and clearcoats 1 to 3 and C 1

| | Parts by weight in clearcoat material | | | |
|---|---|---|---|---|
| Ingredients | 10.1 | 10.2 | 10.3 | C 1 |
| Condensate (A) from Preparation Example 9 | 5 | 5 | 5 | 5 |
| 1% strength by weight aqueous solution of surface-modified barium sulphate nanoparticles (N)[a] | 0.5 | 0.75 | 0.5 | — |
| 1% strength by weight solution of methylimidazole in propyl glycol | — | — | 0.11 | — |
| Flow control agent (Byk ®301 from Byk Chemie) | 0.6 | 0.6 | 0.6 | 0.6 |
| Steel wool scratch test (rating) | 2 | 2 | 1 | 5 |

[a]barium sulphate nanoparticles with a primary particle size of 20 nm, modified with an addition polymer containing lateral polyoxyethylene groups and carboxylate groups (Melpers ®0030 from SKW)

The results underline the high scratch resistance of clearcoats 10.1 to 10.3. It is surprising that the high scratch resistance was obtainable even with very small amounts of surface-modified barium sulphate nanoparticles (N), of the order of 0.1% to 0.15% by weight, based on the solids.

Example 11

Clearcoat Material Using a Stabilized Barium Sulphate Suspension; and Comparative Example C2

11.1: The Preparation of Clearcoat Materials 11 and C2 and also the Production of Clearcoats 11 and C2

Clearcoat materials 11 and C2 were prepared by mixing the constituents indicated in Table 7 and homogenizing the resulting mixtures. The two clearcoat materials were transparent and clear, transportable and stable on storage.

Clearcoat materials 11 and C2 were prepared by concentrating the 1% strength by weight solution of the surface-modified barium sulphate nanoparticles (N) (cf. Table 1) under reduced pressure to give a 10% strength by weight solution. The solution was adjusted to a pH of 6 using 0.5 N acetic acid. Subsequently 10% by weight of a 0.5% strength ammonia solution were added, resulting in a pH of 9. As a result of this the concentrated solution was stable on storage for a period of more than 4 weeks at room temperature. The hydrodynamic volume of the surface-modified barium sulphate nanoparticles (N) was determined by employing dynamic light scattering (PCS). This gave a hydrodynamic radius of 24 nm. Taking into account the influence of the surface modification and of the hydrate shell, the particle size of the actual barium sulphate nanoparticles was 20 nm.

Clearcoat materials 11 and C2 were knifecoated onto glass panels and cured thermally at 140° C. for 22 minutes. Thermal curing was carried out using forced-air ovens from Heraeus.

High-gloss, clear clearcoats 11 and C2 were obtained which exhibited very good levelling and were free from stress cracks and surface defects such as craters. Their scratch resistance was determined by means of the steel wool scratch test and by means of the relative elastic resilience (Fischerscope), which correlates very well with the carwash resistance.

The results are likewise found in Table 7. They again underline the fact that the use of surface-modified barium sulphate nanoparticles (N) even in small amounts leads to a significant increase in scratch resistance and carwash resistance.

TABLE 7

The physical composition and scratch resistance of clearcoat materials and clearcoats 11 and C 2

| Ingredients | Parts by weight in clearcoat material | |
|---|---|---|
| | 11 | C 2 |
| Condensate (A) from Preparation Example 9 | 3 | 5 |
| 10% strength by weight aqueous solution of surface-modified barium sulphate nanoparticles (N)$^{a)}$ | 0.5 | — |
| Flow control agent (Byk ®301 from Byk Chemie) | 0.6 | 0.6 |
| Steel wool scratch test (rating) | 5 | 2 |
| Relative elastic resilience (%) | 54.75 | 61.12 |

The invention claimed is:

1. A deagglomerated barium sulphate comprising a dispersant, primary particles, and secondary particles, wherein said primary particles comprise a crystallization inhibitor and have an average size <0.1 μm, wherein the crystallization inhibitor and the dispersant are different compounds and wherein the dispersant comprises at least one anionic group and is substituted by at least one polyether group.

2. The deagglomerated barium sulphate according to claim 1, wherein 90% of the secondary barium sulphate particles are smaller than 250 nm.

3. The deagglomerated barium sulphate according to claim 1, wherein the crystallization inhibitor is selected from compounds having at least one anionic group.

4. The deagglomerated barium sulphate according to claim 3, wherein the anionic group of the crystallization inhibitor is at least one sulphate, at least one sulphonate, at least two phosphate, at least two phosphonate or at least two carboxylate group(s).

5. The deagglomerated barium sulphate according to claim 1, wherein the crystallization inhibitor is a compound of the formula (I) or salt thereof having a carbon chain R and n substituents

R-[A(O)OH]$_n$ (I), in which R is an organic radical which has hydrophobic and/or hydrophilic moieties, R being a low molecular mass, oligomeric or polymeric, optionally branched and/or cyclic carbon chain which optionally contains oxygen, nitrogen, phosphorus or sulphur heteroatoms, and/or being substituted by radicals which are attached via oxygen, nitrogen, phosphorus or sulphur to the radical R, and A being C, P(OH), OP(OH), S(O) or OS(O), and n being 1 to 10 000.

6. The deagglomerated barium sulphate according to claim 1, wherein the crystallization inhibitor is a carboxylic acid having at least two carboxylate groups and at least one hydroxyl group, an alkyl sulphate, an alkylbenzenesulphonate, a polyacrylic acid or an optionally hydroxy-substituted diphosphonic acid.

7. The deagglomerated barium sulphate according to claim 1, wherein the dispersant has one or more anionic groups selected from carboxylate, phosphate, phosphonate, bisphosphonate, sulphate and sulfonate groups.

8. The deagglomerated barium sulphate according to claim 1, wherein the dispersant endows the barium sulphate particles with a surface which prevents reagglomeration and/or inhibits agglomeration electrostatically, sterically or both electrostatically and sterically.

9. The deagglomerated barium sulphate according to claim 8, wherein the dispersant has carboxylate, phosphate, phosphonate, bisphosphonate, sulphate or sulphonate groups which are able to interact with the barium sulphate surface and which have one or more organic radicals R$^1$ which have hydrophobic and/or hydrophilic moieties.

10. The deagglomerated barium sulphate according to claim 9, wherein R$^1$ is a low molecular mass, oligomeric or polymeric, optionally branched and/or cyclic carbon chain which optionally contains oxygen, nitrogen, phosphorus or sulphur heteroatoms and/or is substituted by radicals which are attached via oxygen, nitrogen, phosphorus or sulphur to the radical R$^1$ and the carbon chain is optionally substituted by hydrophilic or hydrophobic radicals.

11. The deagglomerated barium sulphate according to claim 9, wherein the dispersant is a phosphoric diester having a polyether group and a C6-C10 alkenyl group as moieties.

12. The deagglomerated barium sulphate according to claim 9, wherein the dispersant has groups for coupling to or into polymers.

13. The deagglomerated barium sulphate according to claim 12, wherein the dispersant prevents reagglomeration sterically and is a polymer which is substituted by polar groups, and as a result thereof the barium sulphate particles are externally hydrophilicized.

14. The deagglomerated barium sulphate according to claim 13, wherein the dispersant has polyether groups substituted by hydroxyl groups or amino groups.

15. The deagglomerated barium sulphate according to claim 14, wherein the hydroxyl groups and amino groups function as reactive groups for coupling to or into polyepoxide resins.

16. The deagglomerated, additionally deagglomerable barium sulphate according to claim 15, wherein the dispersant is a polyether polycarboxylate which is substituted terminally on the polyether groups by hydroxyl groups.

17. The deagglomerated barium sulphate according to claim 1, wherein the crystallization inhibitor and the dispersant are each present in the deagglomerated barium sulphate in an amount of up to 2 parts by weight per part by weight of barium sulphate.

18. The deagglomerated barium sulfate according to claim 1, wherein it is obtained
    a) by wet-grinding a barium sulphate precipitated using a crystallization inhibitor, the wet grinding taking place in the presence of the dispersant, or
    b) by precipitating barium sulphate in the presence of a crystallization inhibitor and of a dispersant which prevents reagglomeration and/or inhibits agglomeration electrostatically, sterically, or both electrostatically and sterically.

19. The deagglomerated barium sulphate according to claim 1, wherein it is in the form of a suspension in water, in an organic liquid, in a mixture of water and organic liquid, or as a suspension in a plastics premix, it being possible for stabilizing additives to be present.

20. The deagglomerated barium sulphate in the form of a suspension according to claim 19, wherein it is present in the suspension in an amount of 0.1% up to 70% by weight.

21. A dry powder which can be redispersed to form deagglomerated barium sulphate, obtainable by drying deagglomerated barium sulphate according to claim 1.

22. A process for preparing deagglomerated barium sulphate according to claim 1, wherein
   a) precipitated barium sulphate having a primary particle size of <0.1 μm is deagglomerated and optionally dried in the presence of a dispersant and water or an organic liquid or a mixture thereof, starting from barium sulphate precipitated in the presence of a crystallization inhibitor, or
   b) barium sulphate having a primary particle size of <0.1 μm is precipitated in the presence of a crystallization inhibitor and a dispersant which prevents reagglomeration and/or inhibits agglomeration, and is optionally dried.

23. The process according to claim 22, wherein barium sulphate with a primary particle size <0.1 μm is precipitated or used and the barium sulphate is optionally deagglomerated until 90% of the secondary particles are <1 μm.

24. The process according to claim 22, wherein the deagglomerated barium sulphate is dried and/or processed, optionally with addition or removal of water, an organic liquid or a mixture of both, to give a suspension which contains water or an optionally water-containing organic liquid.

25. A plastics premix comprising deagglomerated barium sulphate according to claim 1.

26. A method of use of deagglomerated barium sulphate according to claim 1 for producing plastics or adhesives.

27. A plastic or adhesive comprising deagglomerated barium sulphate according to claim 1.

28. A curable composition comprising at least one curable constituent selected from the group consisting of low molecular mass, oligomeric and polymeric compounds and deagglomerated barium sulphate according to claim 1.

29. The barium sulphate according to claim 1, wherein the barium sulphate has a primary particle size of <30 nm.

30. The barium sulphate according to claim 1, wherein the barium sulphate has a BET surface area of at least 30 $m^2/g$.

31. The barium sulphate according to claim 1, wherein the crystallization inhibitor is citric acid.

32. The deagglomerated barium sulphate according to claim 1, wherein 90% of the secondary barium sulphate particles are smaller than 2 μm.

33. The deagglomerated barium sulphate according to claim 1, wherein the crystallization inhibitor and the dispersant are each present in the deagglomerated barium sulphate in an amount of 1% to 50% by weight per part by weight of barium sulphate in each case.

34. The deagglomerated barium sulphate according to claim 19, wherein a stabilizing additive is present and is a carboxylic acid.

* * * * *